(12) United States Patent
Zhang et al.

(10) Patent No.: US 10,945,238 B2
(45) Date of Patent: Mar. 9, 2021

(54) METHOD AND DEVICE IN UE AND BASE STATION USED FOR WIRELESS COMMUNICATION

(71) Applicant: SHANGHAI LANGBO COMMUNICATION TECHNOLOGY COMPANY LIMITED, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/436,929

(22) Filed: Jun. 11, 2019

(65) Prior Publication Data

US 2019/0380110 A1    Dec. 12, 2019

(30) Foreign Application Priority Data

Jun. 12, 2018 (CN) .......................... 201810598269.2
Jul. 2, 2018 (CN) .......................... 201810707338.9

(51) Int. Cl.
*H04W 72/04* (2009.01)
*H04W 52/36* (2009.01)
*H04W 52/38* (2009.01)
*H04W 74/08* (2009.01)

(52) U.S. Cl.
CPC ......... *H04W 72/04* (2013.01); *H04W 52/367* (2013.01)

(58) Field of Classification Search
CPC ... H04W 72/04; H04W 52/367; H04W 52/38; H04W 74/0808
See application file for complete search history.

(56) References Cited

U.S. PATENT DOCUMENTS

| | | | |
|---|---|---|---|
| 2016/0056929 A1* | 2/2016 | Kwon | H04L 5/006 370/338 |
| 2017/0105217 A1* | 4/2017 | Kwon | H04W 52/244 |
| 2017/0273109 A1* | 9/2017 | Babaei | H04W 72/1268 |
| 2017/0318580 A1* | 11/2017 | Park | H04W 72/042 |

(Continued)

*Primary Examiner* — Andrew Lai
*Assistant Examiner* — Harry H Kim
(74) *Attorney, Agent, or Firm* — Maschoff Brennan

(57) ABSTRACT

A method and a device in a UE and a base station used for wireless communication are provided. First information and a first target signal are received, the first information indicates a listening type; it's determined whether a first time-frequency resource is used for wireless transmission based on the listening type indicated by the first information; if yes, a first radio signal is transmitted with a first power on the first time-frequency resource; wherein if the listening type indicated by the first information is a first listening type, the first power cannot exceed a first maximum transmitting power, receiving quality of the first target signal is used for determining the first maximum transmitting power; if the listening type indicated by the first information is a second listening type, the first power cannot exceed a second maximum transmitting power. The method ensures equity and improves transmission efficiency and spectral utilization ratio.

17 Claims, 14 Drawing Sheets

(56) References Cited

U.S. PATENT DOCUMENTS

| | | | |
|---|---|---|---|
| 2018/0027582 A1* | 1/2018 | Yerramalli | H04W 52/367 |
| | | | 370/336 |
| 2018/0279365 A1* | 9/2018 | Wang | H04W 74/0808 |
| 2019/0075592 A1* | 3/2019 | Li | H04W 24/02 |
| 2020/0344802 A1* | 10/2020 | Tang | H04W 16/14 |

\* cited by examiner

METHOD AND DEVICE IN UE AND BASE STATION USED FOR WIRELESS COMMUNICATION

CROSS-REFERENCE TO RELATED APPLICATION

This application claims the priority benefit of Chinese Patent Application Serial Number 201810598269.2, filed on Jun. 12, 2018, and Chinese Patent Application Serial Number 201810707338.9, filed on Jul. 2, 2018, the full disclosure of which is incorporated herein by reference.

BACKGROUND

Technical Field

The present disclosure relates to transmission methods and devices in wireless communication systems, and in particular to a communication method and a communication device supporting communication on Listen Before Talk (LBT).

Related Art

Application scenarios of future wireless communication systems are becoming increasingly diversified, and different application scenarios have different performance demands on systems. In order to meet different performance requirements of various application scenarios, decided to conduct the study of New Radio (NR). The work item of accessing unlicensed spectrum was approved at the 3rd Generation Partner Project (3GPP) Radio Access Network (RAN) #75 plenary session.

In License Assisted Access (LAA) of Long Term Evolution (LTE), a transmitter (a base station or a User Equipment) first needs to perform LBT before transmitting data on unlicensed spectrum so as to avoid interference with other ongoing wireless transmissions on unlicensed spectrum. In the process of Cat 4 LBT (a fourth type of LBT, see 3GPP TR 36. 889), the transmitter will implement backoff after a certain defer duration, the time for backoff is counted based on a unit of Clear Channel Assessment (CCA) slot duration, a number of slot durations within backoff is randomly chosen by the transmitter within Contention Window Size (CWS). For downlink transmission, CWS is adjusted according to Hybrid Automatic Repeat reQuest (HARQ) feedback corresponding to data of a previous reference sub-frame that has been transmitted on the unlicensed spectrum. For uplink transmission, CWS is adjusted according to whether new data is included in data of a previous reference sub-frame on the unlicensed spectrum.

A consensus around NR LAA reached at the 3GPP RAN 1 #93 plenary session is as follows:

In a gNB Channel Occupation Time (COT), for any time interval from downlink to uplink or from uplink to downlink that is less than 16 micro seconds (p), no-LBT can be applied in LAA communication.

SUMMARY

The above consensus about NR LAA utilizes radio signals transmitted by a transmitter to occupy radio resources, a receiver then can be switched to transmitting status without performing LBT. The inventors have found through researches that radio resource reserved by radio signals transmitted by the transmitter shall be spatially limited, otherwise, inequity may be caused. The inventors also find through further researches that if no-LBT is employed, a maximum transmitting power of the receiver shall be related to usable power of radio signals received since the latter determines a valid range of radio resources reserved by the radio signals in space.

In view of the above discovery, the present disclosure provides a solution. It should be noted that embodiments of the present disclosure and characteristics of the embodiments may be arbitrarily combined if no conflict is incurred. Further, though originally targeted at LAA communication, the method and device in the present disclosure can also be applied in communication on licensed spectrum.

The present disclosure provides a method in a UE used for wireless communication, comprising:
  receiving first information and a first target signal, the first information indicates a listening type; and
  determining whether a first time-frequency resource is used for wireless transmission based on the listening type indicated by the first information;
  if it is determined that a first time-frequency resource is used for wireless transmission, a first radio signal is transmitted with a first power on the first time-frequency resource; otherwise, wireless transmission on the first time-frequency resource is dropped;
  wherein if the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the fact that a transmitting power of the first radio signal is too large may lead to interference with a target receiver—the first target signal cannot stop wireless transmission of a target transmitter pairing with the first target receiver; in the above method, a maximum value of the first power is related to a receiving power of the first target signal at the UE side, thereby reducing interference of the first radio signal with the target receiver, and as a result inequity brought about by no-LBT will be avoided.

Specifically, according to one aspect of the present disclosure, comprising:
  receiving second information;
  wherein the second information indicates a first offset, the first offset is used for determining the first maximum transmitting power.

In one embodiment, the above method allows a serving cell to adjust a first maximum transmitting power in a flexible manner so as to strike a balance between equity and chance for transmission.

In one embodiment, the first offset is related to a first ratio, the first ratio is a ratio of a total transmitting power on multicarrier symbols occupied by the first target signal to a transmitting power of the first target signal.

In the above embodiment, the serving cell can elastically configure a transmitting power of a first target signal, which helps improve flexibility of scheduling.

In one embodiment, the first offset divided by 10 equals a first reference value, 10 to the power of a first reference value is equal to the first ratio.

In one embodiment, the first offset rises as the first ratio increases.

Specifically, according to one aspect of the present disclosure, comprising:

receiving third information;

wherein the third information indicates a first coefficient, the first maximum transmitting power is linearly correlated to the reception quality of the first target signal, the first coefficient is a linear correlation coefficient between the first maximum transmitting power and the reception quality of the first target signal.

Specifically, according to one aspect of the present disclosure, wherein if the listening type indicated by the first information is the first listening type, it is determined that the first time-frequency resource is used for wireless transmission.

In one embodiment, there is no need to perform corresponding LBT before transmitting the first radio signal.

Specifically, according to one aspect of the present disclosure, wherein if the listening type indicated by the first information is the second listening type, comprising:

Performing a first channel monitoring so as to determine whether a first time-frequency resource is used for wireless transmission.

Specifically, according to one aspect of the present disclosure, comprising:

receiving Q signaling(s);

wherein any signaling of the Q signaling(s) indicates a listening type and a power offset; for any signaling of the Q signaling(s), if the listening type indicated by the any signaling is the same as the listening type indicated by the first information, the first power is related to the power offset indicated, otherwise, the first power is not related to the power offset indicated; Q is a positive integer.

In one embodiment, as described in the above method, the first listening type and the second listening type correspond to separate power control processes respectively; the above method controls the transmitting power of the UE more effectively, thus enhancing transmission efficiency and reducing interference.

Specifically, according to one aspect of the present disclosure, wherein the first information belongs to first downlink control information (DCI), the first DCI indicates the first time-frequency resource.

Specifically, according to one aspect of the present disclosure, comprising:

receiving fourth information;

wherein the first target signal occupies a first resource element set, the fourth information is used for indicating the first resource element set.

The present disclosure provides a method in a base station used for wireless communication, comprising:

transmitting first information and a first target signal, the first information indicates a listening type; and monitoring a first radio signal on a first time-frequency resource;

wherein the listening type indicated by the first information is used for determining whether a first time-frequency resource is used for wireless transmission; if it is determined that a first time-frequency resource is used for wireless transmission, the first radio signal is transmitted with a first power on the first time-frequency resource; otherwise, wireless transmission on the first time-frequency resource is dropped. If the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

Specifically, according to one aspect of the present disclosure, comprising:

transmitting second information;

wherein the second information indicates a first offset, the first offset is used for determining the first maximum transmitting power.

Specifically, according to one aspect of the present disclosure, comprising:

transmitting third information;

wherein the third information indicates a first coefficient, the first maximum transmitting power is linearly correlated to the reception quality of the first target signal, the first coefficient is a linear correlation coefficient between the first maximum transmitting power and the reception quality of the first target signal.

Specifically, according to one aspect of the present disclosure, wherein if the listening type indicated by the first information is the first listening type, it is determined that a first time-frequency resource is used for wireless transmission.

Specifically, according to one aspect of the present disclosure, wherein if the listening type indicated by the first information is the second listening type, a first channel monitoring is performed by a transmitter of the first radio signal to determine whether the first time-frequency resource is used for wireless transmission.

Specifically, according to one aspect of the present disclosure, comprising:

transmitting Q signaling(s);

wherein any signaling of the Q signaling(s) indicates a listening type and a power offset; for any signaling of the Q signaling(s), if the listening type indicated by the any signaling is the same as the listening type indicated by the first information, the first power is related to the power offset indicated, otherwise, the first power is not related to the power offset indicated; Q is a positive integer.

Specifically, according to one aspect of the present disclosure, wherein the first information belongs to first DCI, the first DCI indicates the first time-frequency resource.

Specifically, according to one aspect of the present disclosure, comprising:

transmitting fourth information;

wherein the first target signal occupies a first resource element set, the fourth information is used for indicating the first resource element set.

The present disclosure provides a UE used for wireless communication, comprising:

a first receiver: receiving first information and a first target signal, the first information indicates a listening type;

a first determiner: determining whether a first time-frequency resource is used for wireless transmission based on the listening type indicated by the first information;

and a first transmitter: if it is determined that a first time-frequency resource is used for wireless transmission, a first radio signal is transmitted with a first power on the first time-frequency resource; otherwise, wireless transmission on the first time-frequency resource is dropped;

wherein if the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the UE used for wireless communication is characterized in that the first receiver receives second information; wherein the second information indicates a first offset, the first offset is used for determining the first maximum transmitting power.

In one embodiment, the UE used for wireless communication is characterized in that the first receiver receives third information; wherein the third information indicates a first coefficient, the first maximum transmitting power is linearly correlated to the reception quality of the first target signal, the first coefficient is a linear correlation coefficient between the first maximum transmitting power and the reception quality of the first target signal.

In one embodiment, the UE used for wireless communication is characterized in that the first receiver receives fourth information; wherein the first target signal occupies a first resource element set, the fourth information is used for indicating the first resource element set.

In one embodiment, the UE used for wireless communication is characterized in that the listening type indicated by the first information is the first listening type, the first determiner determines that the first time-frequency resource is used for wireless transmission.

In one embodiment, the UE used for wireless communication is characterized in that the listening type indicated by the first information is the second listening type, the first determiner performs a first channel monitoring to determine whether the first time-frequency resource is used for wireless transmission.

In one embodiment, the UE used for wireless communication is characterized in that the first receiver receives Q signaling(s); wherein any signaling of the Q signaling(s) indicates a listening type and a power offset; for any signaling of the Q signaling(s), if the listening type indicated by the any signaling is the same as the listening type indicated by the first information, the first power is related to the power offset indicated, otherwise, the first power is not related to the power offset indicated; Q is a positive integer.

In one embodiment, the UE used for wireless communication is characterized in that the first information belongs to first DCI, the first DCI indicates the first time-frequency resource.

The present disclosure provides a base station used for wireless communication, comprising:

a second transmitter: transmitting first information and a first target signal, the first information indicates a listening type; and a second receiver: monitoring a first radio signal on a first time-frequency resource;

wherein the listening type indicated by the first information is used for determining whether a first time-frequency resource is used for wireless transmission; if it is determined that the first time-frequency resource is used for wireless transmission, the first radio signal is transmitted with a first power on the first time-frequency resource; otherwise, wireless transmission on the first time-frequency resource is dropped, if the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the above base station used for wireless communication is characterized in that the second transmitter transmits second information; wherein the second information indicates a first offset, the first offset is used for determining the first maximum transmitting power.

In one embodiment, the above base station used for wireless communication is characterized in that the second transmitter transmits third information; wherein the second information indicates a first coefficient, the first maximum transmitting power is linearly correlated to the reception quality of the first target signal, the first coefficient is a linear correlation coefficient between the first maximum transmitting power and the reception quality of the first target signal.

In one embodiment, the above base station used for wireless communication is characterized in that the second transmitter transmits fourth information; wherein the first target signal occupies a first resource element set, the fourth information is used for indicating the first resource element set.

In one embodiment, the above base station used for wireless communication is characterized in that if the listening type indicated by the first information is the first listening type, a first time-frequency resource is used for wireless transmission.

In one embodiment, the above base station used for wireless communication is characterized in that if the listening type indicated by the first information is the second listening type, a first channel monitoring is performed by a transmitter of the first radio signal to determine whether the first time-frequency resource is used for wireless transmission.

In one embodiment, the above base station used for wireless communication is characterized in that the second transmitter transmits Q signaling(s); wherein any signaling of the Q signaling(s) indicates a listening type and a power offset; for any signaling of the Q signaling(s), if the listening type indicated by the any signaling is the same as the listening type indicated by the first information, the first power is related to the power offset indicated, otherwise, the first power is not related to the power offset indicated; Q is a positive integer.

In one embodiment, the above base station used for wireless communication is characterized in that the first information belongs to first DCI, the first DCI indicates the first time-frequency resource.

In one embodiment, the present disclosure has the following advantages over conventional schemes:

ensuring the equity of resource occupation;
reducing interference; and
controlling a transmitting power flexibly, thus increasing transmission efficiency.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

Embodiment 1

Figure 1:
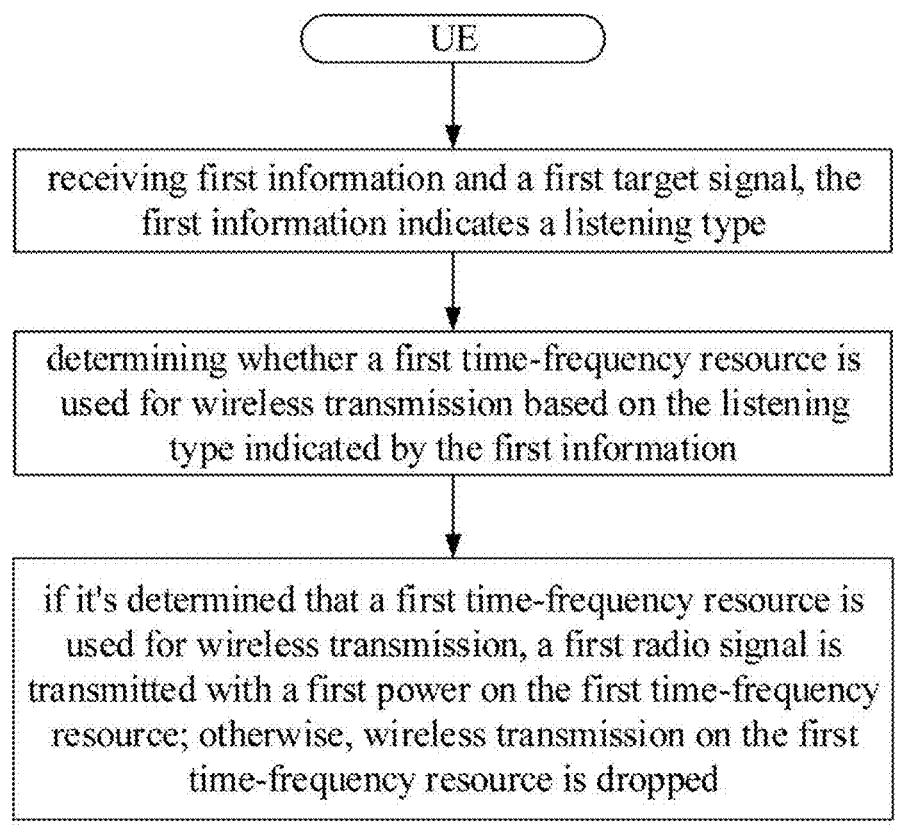
FIG. 1 illustrates a flowchart of processing at a UE side according to one embodiment of the present disclosure.

Embodiment 1 illustrates a flowchart of processing at a UE side, as shown in FIG. 1.

In Embodiment 1, a UE first receives first information and a first target signal, the first information indicating a listening type; and then determines whether a first time-frequency resource is used for wireless transmission based on the listening type indicated by the first information; if it is determined that a first time-frequency resource is used for wireless transmission, a first radio signal is transmitted with a first power on the first time-frequency resource; otherwise, wireless transmission on the first time-frequency resource is dropped.

In Embodiment 1, if the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the first information belongs to a first signaling, the above action of receiving first information includes: receiving a first receiving signaling; the first signaling is a DCI.

In one embodiment, if the listening type indicated by the first information is a first listening type, the first power is a smaller value between a first ideal power and the first maximum transmitting power; if the listening type indicated by the first information is a second listening type, the first power is a smaller value between a first ideal power and the second maximum transmitting power; the first ideal power is related to at least one of an expected receiving power, a number of sub-carriers occupied by the first radio signal, downlink path loss, accumulated power offsets indicated by a positive integer number of Transmitting Power Control (TPC) command(s), and whether the first radio signal comprises Uplink Control Information (UCI).

In one embodiment, the first ideal power is linearly correlated to the expected receiving power, a linear correlation coefficient between the first ideal power and the expected receiving power is 1, the expected receiving power is configured by a higher-layer signaling.

In one embodiment, the first ideal power is linearly correlated to the downlink path loss, a linear correlation coefficient between the first ideal power and the expected receiving power is configured by a higher-layer signaling.

In one embodiment, the first ideal power is linearly correlated to the accumulated power offsets indicated by a positive integer number of TPC command(s), a linear correlation coefficient between the first ideal power and the accumulated power offsets indicated by a positive integer number of TPC command(s) is 1, the positive integer number of TPC command(s) is(are) carried by a positive integer number of DCI(s) respectively.

In one embodiment, the first ideal power is linearly correlated to a first power component, a linear correlation coefficient between the first ideal power and the first power component is 1, the first power component is related to the number of sub-carriers occupied by the first radio signal.

In one embodiment, the first ideal power is linearly correlated to a second power component, a linear correlation coefficient between the first ideal power and the second power component is 1, the second power component is related to whether the first radio signal carries UCI.

In one embodiment, the first ideal power=the expected receiving power+10*log 10 (a first coefficient*the number of sub-carriers occupied by the first radio signal/12)+a second coefficient*downlink path loss+$\Sigma_{i=1}^{K} P_i$; the first coefficient is an integer number of power of 2, the second coefficient is configured by a higher-layer signaling, the positive integer in the positive integer number of TPC command(s) is K, the $P_i$ is a power offset indicated by the i-th TPC command therein.

In one embodiment, the first ideal power=the expected receiving power+10*log 10 (a first coefficient*the number of sub-carriers occupied by the first radio signal/12)+a second coefficient*downlink path loss+$\Sigma_{i=1}^{K} P_i + \Delta_{TF,f,c}(i)$; the first coefficient is an integer number of power of 2, the second coefficient is configured by a higher-layer signaling, the positive integer in the positive integer number of TPC command(s) is K, the $P_i$ is a power offset indicated by the i-th TPC command therein, the $\Delta_{TF,f,c}(i)$ is a parameter related to the content carried by the first radio signal, the specific meaning of which can be found in 3GPP TR38.213, Section 7.

In one embodiment, the first power, the first maximum transmitting power and the second maximum transmitting power share a unit of dBm.

In one embodiment, the first power, the first maximum transmitting power and the second maximum transmitting power share a unit of mW.

In one embodiment, frequency domain resources occupied by the first radio signal are deployed on unlicensed spectrum.

In one embodiment, frequency domain resources occupied by the first target signal are deployed on unlicensed spectrum.

In one embodiment, frequency domain resources occupied by the first radio signal and frequency domain resources occupied by the first target signal belong to one same carrier.

In one embodiment, frequency domain resources occupied by the first radio signal and frequency domain resources occupied by the first target signal belong to one same Bandwidth Part (BWP).

In one embodiment, the first maximum transmitting power is linearly correlated to reception quality of the first target signal.

In one embodiment, a linear correlation coefficient between the first maximum transmitting power and the reception quality of the first target signal is 1.

In one embodiment, a linear correlation coefficient between the first maximum transmitting power and the reception quality of the first target signal is greater than 1.

In one embodiment, the first information is broadcast.

In one embodiment, the first information is carried by a physical layer signaling.

In one embodiment, the first information is dynamically configured.

In one embodiment, the first information belongs to a first signaling, the first signaling is a DCI.

In one embodiment, the first information is a field of the first signaling.

In one embodiment, the first signaling is identified by identification of the UE.

In one embodiment, a search space to which the first signaling belongs is indicated by identification of the UE.

In one embodiment, a Cyclic Redundancy Check (CRC) bit corresponding to the first signaling is added to an information bit of the first signaling after being scrambled by identification of the UE and then is taken as an input of a channel coding together with an information bit of the first signaling.

In one embodiment, the identification of the UE includes Radio Network Temporary Identifier (RNTI) allocated to the UE.

In one embodiment, the identification of the UE comprises 16 bits.

In one embodiment, the first target signal occupies a first Resource Element (RE) set, the first RE set consists of multiple REs.

In one embodiment, the reception quality of the first target signal includes an average value of energy of the first target signal received on each RE of the first RE set.

In one embodiment, the reception quality of the first target signal includes Reference Signal Receiving Power (RSRP) of the first target signal.

In one embodiment, the reception quality of the first target signal includes Signal to Interference and Noise Ratio (SINR) acquired on the basis of detection on the first target signal.

In one embodiment, the reception quality of the first target signal includes Chanel Quality Indicator (CQI) acquired on the basis of detection on the first target signal.

In one embodiment, the first maximum transmitting power and reception quality of the first target signal have a one-to-one correspondence relationship.

In one embodiment, a unit of the reception quality of the first target signal is dBm.

In one embodiment, a unit of the reception quality of the first target signal is mW.

In one embodiment, the first listening type refers to: there is no need to perform LBT.

In one embodiment, the second listening type refers to: it is necessary to perform LBT.

In one embodiment, the second listening type includes multiple types of LBT, so the fact that the first information indicates any one of the multiple types of LBT means that the first information indicates the second listening type.

In one embodiment, the multiple types of LBT comprise category 2 LBT.

In one embodiment, the multiple types of LBT comprise category 4 LBT.

In one embodiment, the multiple types of LBT at least comprise a type of one shot LBT and multiple shot LBT.

In one embodiment, the first target signal comprises a Channel Status Information Reference Signal (CSI-RS).

In one embodiment, the first target signal comprises a DeModulation Reference Signal (DMRS).

In one embodiment, the first target signal comprises a Phase Tracking Reference Signal (PTRS).

In one embodiment, a DCI to which the first information belongs is used for indicating the first RE set.

In one embodiment, time domain resources occupied by the first information and time domain resources occupied by the first target signal belong to one same gNB COT.

In one embodiment, the first information is transmitted on a Physical Downlink Control Channel (PDCCH).

In one embodiment, the first information is transmitted on a shorten Physical Downlink Control Channel (sPDCCH).

In one embodiment, the first radio signal is transmitted on a Physical Uplink Shared Channel (PUSCH).

In one embodiment, a transmission channel for the first radio signal is an Uplink Shared Channel (UL-SCH).

In one embodiment, the first time-frequency resource comprises multiple REs.

In one embodiment, the first time-frequency resource comprises multiple REs allocated to PUSCH and multiple REs allocated to DMRS.

In one embodiment, the REs occupy a multicarrier symbol in time domain, and occupy a sub-carrier in frequency domain.

In one embodiment, the multicarrier symbol is an Orthogonal Frequency Division Multiplexing (OFDM) symbol.

In one embodiment, the multicarrier symbol is a Single Carrier Frequency Division Multiplexing Access (SC-FDMA) symbol.

In one embodiment, the multicarrier symbol is a Filter Bank Multi-Carrier (FBMC) symbol.

In one embodiment, the first information comprises 1 bit, the 1 bit indicates a first listening type or a second listening type.

In one embodiment, the number of bits comprised in the first information is greater than 0, the first information indicates a choice among X+1 choices of a first listening type and X types of LBT, the X is a positive integer greater than 1; any type of LBT out of the X types of LBT belongs to the second listening type.

In one embodiment, the X types of LBT comprise Category 2 LBT.

In one embodiment, the X types of LBT comprise Category 4 LBT.

In one embodiment, the X types of LBT at least comprise a type of one shot LBT and a type of multiple shot LBT.

In one embodiment, the second maximum transmitting power does not exceed 23 dBm.

In one embodiment, the second maximum transmitting power does not exceed 30 dBm.

In one embodiment, the second maximum transmitting power does not exceed 33 dBm.

Embodiment 2

Figure 2:
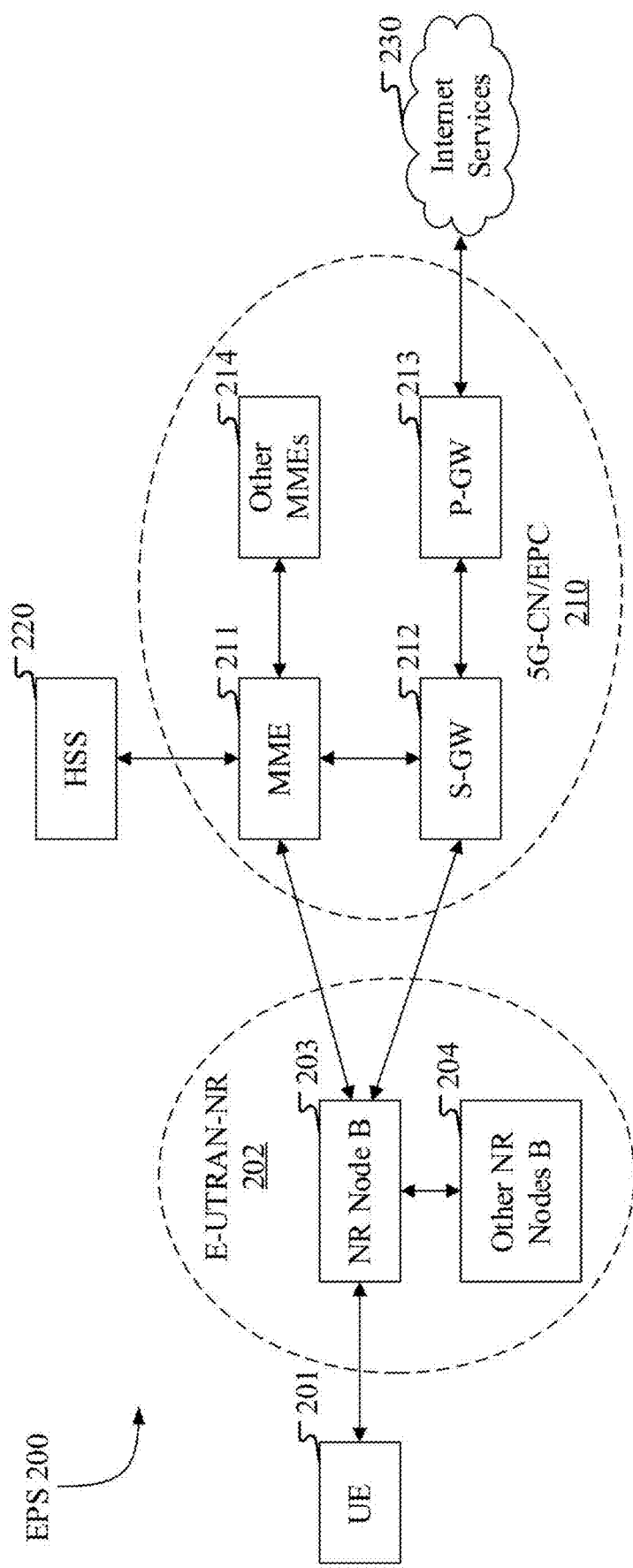
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and NR 5G systems. The LTE network architecture 200 may be called an Evolved Packet System (EPS) 200. The EPS 200 may comprise one or more UEs 201, an E-UTRAN-NR 202, a 5G-Core Network/Evolved Packet Core (EPC/5G-CN) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201 oriented user plane and control plane terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BBS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises an MME 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSSs).

In one embodiment, the UE 201 corresponds to a UE in the present disclosure.

In one embodiment, the gNB 203 corresponds to a base station in the present disclosure.

In one embodiment, the UE 201 supports wireless communication in which data transmission is performed on unlicensed spectrum.

In one embodiment, the gNB 203 supports wireless communication in which data transmission is performed on unlicensed spectrum.

In one embodiment, the UE 201 supports power control.

In one embodiment, the gNB 203 supports power control.

Embodiment 3

Embodiment 3 illustrates a schematic diagram of a radio protocol architecture of a user plane and a control plane.

Figure 3:
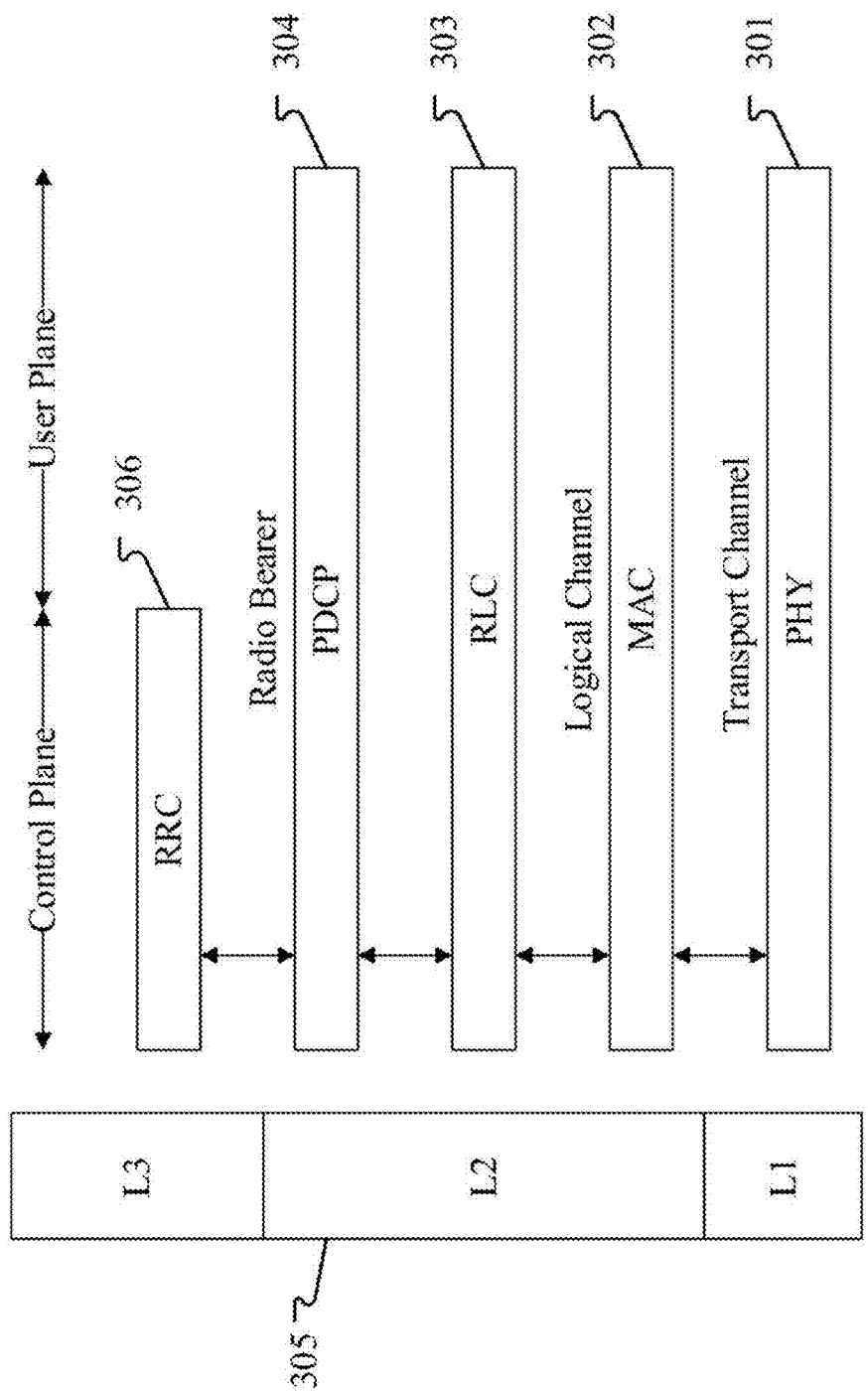
FIG. 3 illustrates a schematic diagram of a radio protocol architecture of a user plane and a control plane according to one embodiment of the present disclosure.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARD). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to a UE in the present disclosure.

In one embodiment, the radio protocol architecture in FIG. 3 is applicable to a base station in the present disclosure.

In one embodiment, the first information in the present disclosure is generated by the PHY 301.

In one embodiment, the first signaling in the present disclosure is generated by the PHY 301.

In one embodiment, the second information in the present disclosure is generated by the PHY 301.

In one embodiment, the third information in the present disclosure is generated by the PHY 301.

In one embodiment, the fourth information in the present disclosure is generated by the PHY 301.

In one embodiment, the Q signaling(s) in the present disclosure is(are) generated by the PHY 301.

In one embodiment, the physical layer signaling in the present disclosure is generated by the PHY 301.

In one embodiment, the second information in the present disclosure is generated by the MAC sublayer 302.

In one embodiment, the third information in the present disclosure is generated by the MAC sublayer 302.

In one embodiment, the fourth information in the present disclosure is generated by the RRC sublayer 306.

In one embodiment, the RRC signaling in the present disclosure is generated by the RRC sublayer 306.

Embodiment 4

Figure 4:
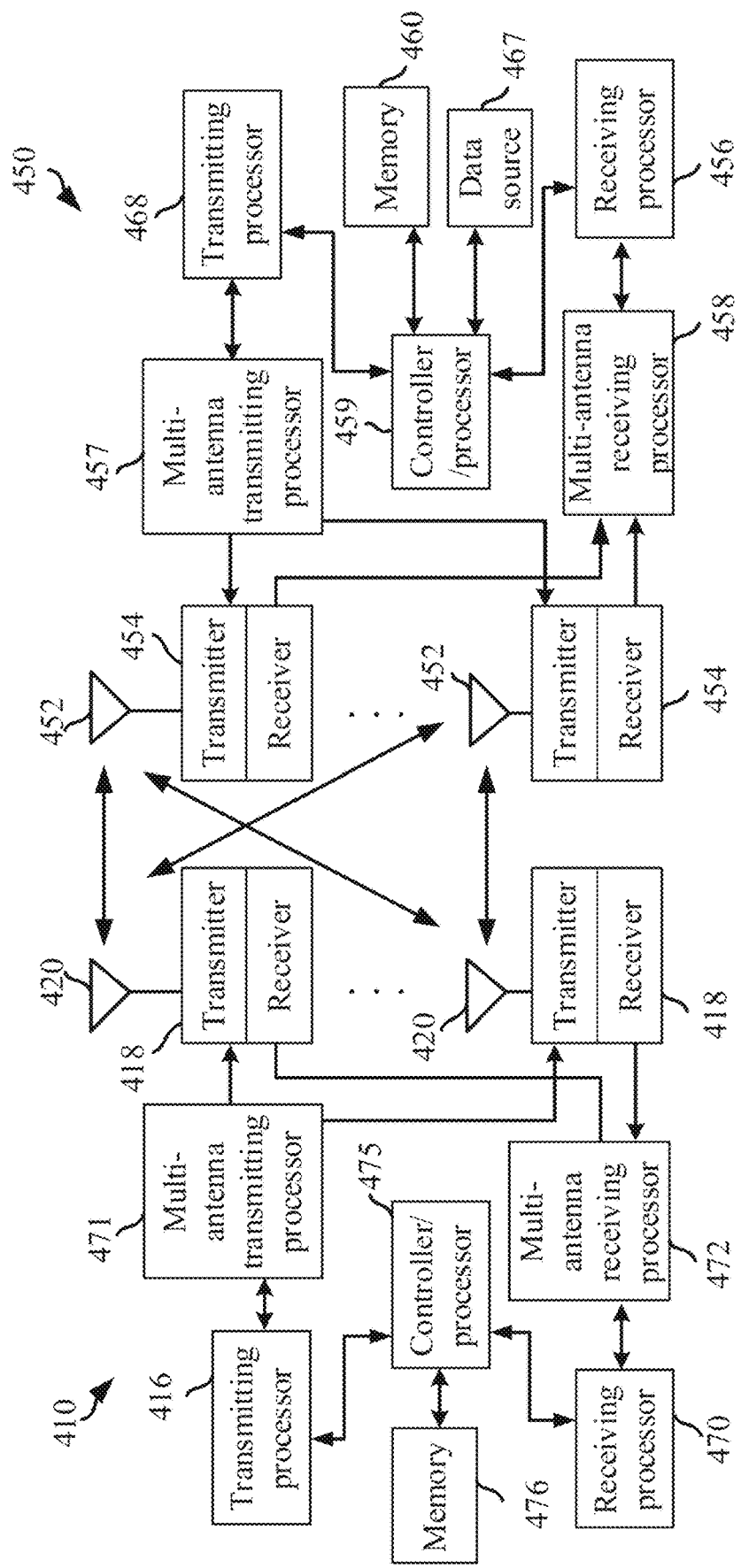
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. A transmitting processor 416 and a multi-antenna transmitting processor 471 perform signal processing functions used for the L1 layer (that is, PHY). The transmitting processor 416 performs coding and interleaving so as to ensure an FEC (Forward Error Correction) and the mapping to signal clusters corresponding to each modulation scheme (i.e., BPSK, QPSK, M-PSK, M-QAM, etc.) at the UE 450 side. The multi-antenna transmitting processor 471 performs spatial precoding/beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. The multi-antenna transmitting processor 471 then performs transmission analog precoding/beamforming operation on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to a receiving processor 456. The receiving processor 456 and a multi-antenna receiving processor 458 perform signal processing functions of the L1 layer. The multi-antenna receiving processor 458 performs reception analog precoding/beamforming operation on the baseband multicarrier symbol stream provided by a receiver 454. The receiving processor 456 converts the operated baseband multicarrier symbol stream from time domain into frequency domain using FFT. In frequency domain, a physical layer data signal and a reference signal are demultiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to a controller/processor 459. The controller/processor 459 performs functions of the L2 layer. The controller/processor 459 can be connected to a memory 460 that stores program code and data. The memory 460 can be called a computer readable medium. In downlink transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In Uplink (UL) transmission, at the UE 450, a data source 467 is configured to provide a higher-layer packet to a controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. A transmitting processor 468 implements modulation mapping and channel coding, and a multi-antenna transmitting processor 457 implements digital multi-antenna spatial precoding/beamforming. A spatial stream generated is then modulated by the transmitting processor 468 into a multicarrier/single-carrier symbol stream. The multicarrier/single-carrier symbol stream is subjected to analog precoding/beamforming operation in the multi-antenna transmitting processor 457 and later is provided to each antenna 452 via a transmitter 454. Each transmitter 454 first converts a baseband symbol stream provided by the multi-antenna transmitting processor 457 into a radio frequency symbol stream, and then provides the radio frequency symbol stream to an antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to a multi-antenna receiving processor 472 and a receiving processor 470. The receiving processor 470 and the multi-antenna receiving processor 472 jointly provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least receives first information and a first target signal, the first information indicates a listening type; and determines whether a first time-frequency resource is used for wireless transmission based on the listening type indicated by the first information; if it is determined that a first time-frequency resource is used for wireless transmission, a first radio signal is transmitted with a first power on the first time-frequency resource; otherwise, wireless transmission on the first time-frequency resource is dropped; wherein if the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the UE 450 comprises a memory that stores a computer readable instruction program. The computer readable instruction program generates an action when executed by at least one processor. The action includes: receiving first information and a first target signal, the first information indicates a listening type; and determining whether a first time-frequency resource is used for wireless transmission based on the listening type indicated by the first information; if it is determined that a first time-frequency resource is used for wireless transmission, a first radio signal is transmitted with a first power on the first time-frequency resource; otherwise, wireless transmission on the first time-frequency resource is dropped; wherein if the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the gNB 410 comprises at least one processor and at least one memory. The at least one memory includes computer program codes. The at least one memory and the computer program codes are configured to be used in collaboration with the at least one processor. The gNB 410 at least: transmits first information and a first target signal, the first information indicates a listening type; and monitors a first radio signal on a first time-frequency resource; wherein the listening type indicated by the first information is used for determining whether a first time-frequency resource is used for wireless transmission; if it is determined that the first time-frequency resource is used for wireless transmission, the first radio signal is transmitted with a first power on the first time-frequency resource; otherwise, wireless transmission on the first time-frequency resource is dropped, if the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the gNB 410 comprises a memory that stores a computer readable instruction program. The computer readable instruction program generates an action when executed by at least one processor. The action includes: transmitting first information and a first target signal, the first information indicates a listening type; and monitoring a first radio signal on a first time-frequency resource; wherein the listening type indicated by the first information is used for determining whether a first time-frequency resource is used for wireless transmission; if it is determined that the first time-frequency resource is used for wireless transmission, the first radio signal is transmitted with a first power on the first time-frequency resource; otherwise, wireless transmission on the first time-frequency resource is dropped, if the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the UE 450 corresponds to a UE in the present disclosure.

In one embodiment, the gNB 410 corresponds to a base station in the present disclosure.

In one embodiment, the antenna 452, the receiver 454 and the receiving processor 456 are used for receiving the first information in the present disclosure; the antenna 420, the transmitter 418, or the transmitting processor 416 are used for transmitting the first information in the present disclosure.

In one embodiment, the antenna 452, the receiver 454 and the receiving processor 456 are used for receiving the first target signal in the present disclosure; the antenna 420, the transmitter 418, or the transmitting processor 416 are used for transmitting the first target signal in the present disclosure.

In one embodiment, the antenna 452, the receiver 454 and the receiving processor 456 are used for receiving the second information in the present disclosure; the antenna 420, the transmitter 418, or the transmitting processor 416 are used for transmitting the second information in the present disclosure.

In one embodiment, the antenna 452, the receiver 454 and the receiving processor 456 are used for receiving the Q signaling(s) in the present disclosure; the antenna 420, the transmitter 418, or the transmitting processor 416 are used for transmitting the Q signaling(s) in the present disclosure.

In one embodiment, at least one of the multi-antenna receiving processor 458 or the controller/processor 459 is used for receiving the first information in the present disclosure; at least one of the multi-antenna transmitting processor 471, or the controller/processor 475 is used for transmitting the first information in the present disclosure.

In one embodiment, at least one of the multi-antenna receiving processor 458 or the controller/processor 459 is used for receiving the first target signal in the present disclosure; at least one of the multi-antenna transmitting processor 471, or the controller/processor 475 is used for transmitting the first target signal in the present disclosure.

In one embodiment, at least one of the multi-antenna receiving processor 458 or the controller/processor 459 is used for receiving the second information in the present disclosure; at least one of the multi-antenna transmitting processor 471, or the controller/processor 475 is used for transmitting the second information in the present disclosure.

In one embodiment, at least one of the multi-antenna receiving processor 458 or the controller/processor 459 is used for receiving the Q signaling(s) in the present disclosure; at least one of the multi-antenna transmitting processor 471, or the controller/processor 475 is used for transmitting the Q signaling(s) in the present disclosure.

In one embodiment, the antenna 420, the receiver 418 and the receiving processor 470 are used for receiving the first radio signal in the present disclosure; the antenna 452, the transmitter 454 and the transmitting processor 468 are used for transmitting the first radio signal in the present disclosure.

In one embodiment, at least one of the multi-antenna receiving processor 472 or the controller/processor 475 is used for receiving the first radio signal in the present disclosure; at least one of the multi-antenna transmitting processor 457 or the controller/processor 459 is used for transmitting the first radio signal in the present disclosure.

In one embodiment, the antenna 452, the receiver 454 and the receiving processor 456 are used for determining whether a first time-frequency resource is used for wireless transmission.

In one embodiment, at least one of the multi-antenna receiving processor 458 or the controller/processor 459 is used for determining whether a first time-frequency resource is used for wireless transmission.

Though originally targeted at describing an NR node and a UE node, FIG. 4 is also applicable to describing two terminals in D2D communication given that the above UE 450 and gNB 410 can be seen as two UEs and functions unique to a base station such as the gNB 410, for example radio resources allocation and communication with a core network, have been deleted.

Embodiment 5

Figure 5:
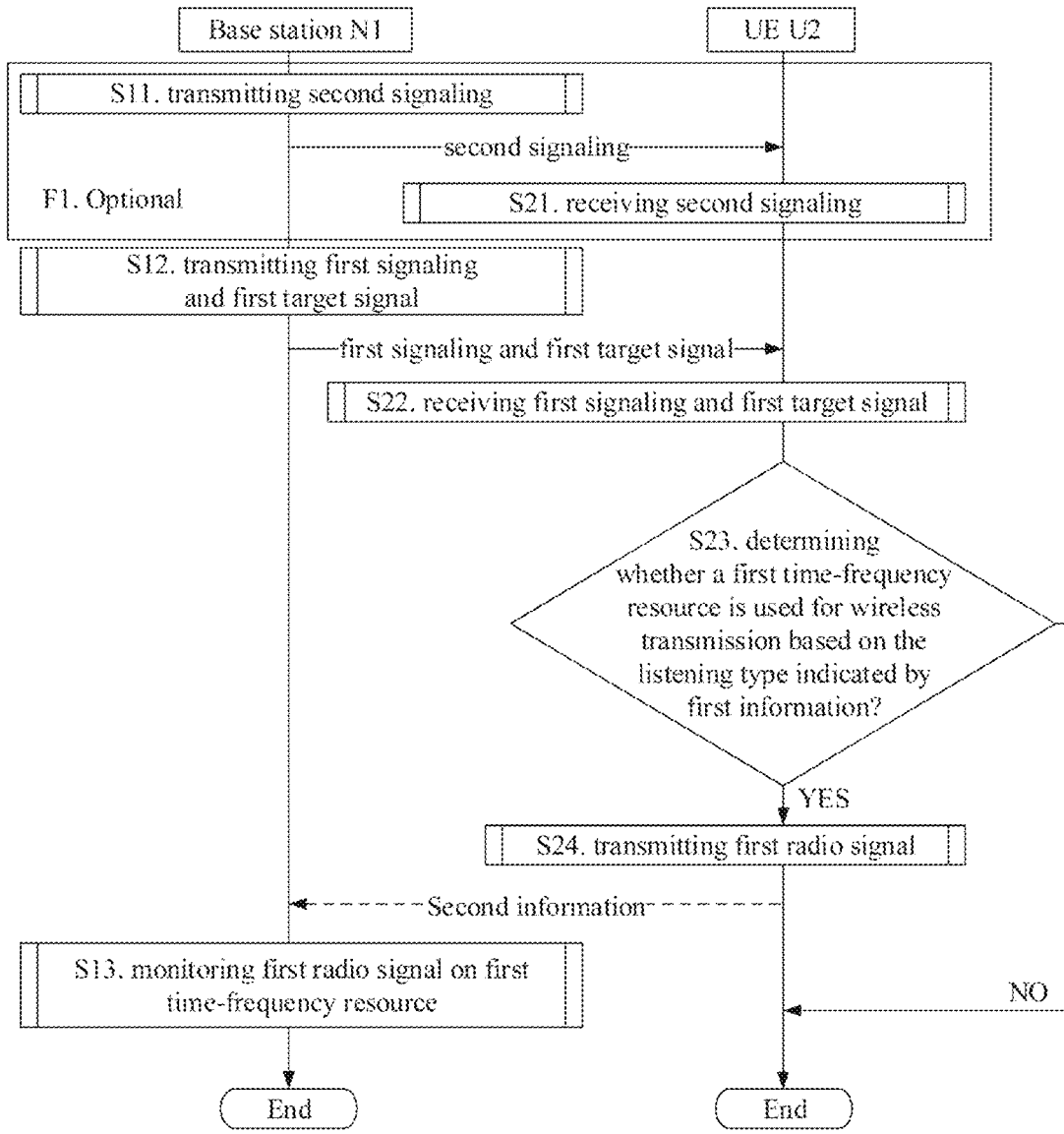
FIG. 5 illustrates a flowchart of wireless transmission according to one embodiment of the present disclosure.

Embodiment 5 illustrates a flowchart of wireless transmission, as shown in FIG. 5, wherein steps in box μl are optional. In FIG. 5, a base station N1 is a maintenance base station for a serving cell of a UE U2.

The base station N1 transmits a second signaling in step S11; transmits a first signaling and a first target signal in step S12; and receives a first radio signal on a first time-frequency resource in step S13.

The UE U2 receives a second signaling in step S21; receives a first signaling and a first target signal in step S22; and determines whether a first time-frequency resource is used for wireless transmission based on a listening type indicated by first information; if the result is yes, a first radio signal is transmitted on a first time-frequency resource in step S24; if the result is no, step S23 comes to an end.

In Embodiment 5, the first signaling comprises first information, if the listening type indicated by the first information is a first listening type, the first power cannot exceed a first maximum transmitting power, reception quality of the first target signal is used by the UE U2 for determining the first maximum transmitting power; if the listening type indicated by the first information is a second listening type, the first power cannot exceed a second maximum transmitting power, the second maximum transmitting power is greater than the first maximum transmitting power.

In one embodiment, the first signaling comprises second information; the second information indicates a first offset, the first offset is used for determining the first maximum transmitting power.

In one embodiment, the second signaling is a higher-layer signaling, the second signaling comprises second information; the second information indicates a first offset, the first offset is used for determining the first maximum transmitting power.

In one subembodiment of any one of the above two embodiments, the first power, the first maximum transmitting power, the second maximum transmitting power and reception quality of the first target signal share a unit of dBm.

In one embodiment, the first signaling comprises third information, the third information indicates a first coefficient, the first maximum transmitting power is linearly correlated to the reception quality of the first target signal, the first coefficient is a linear correlation coefficient between the first maximum transmitting power and the reception quality of the first target signal.

In one embodiment, the second signaling is a higher-layer signaling, the second signaling comprises third information, the third information indicates a first coefficient, the first maximum transmitting power is linearly correlated to the reception quality of the first target signal, the first coefficient is a linear correlation coefficient between the first maximum transmitting power and the reception quality of the first target signal.

In one subembodiment of any one of the above two embodiments, the first power, the first maximum transmitting power, the second maximum transmitting power and reception quality of the first target signal share a unit of mW.

In one embodiment, the first signaling indicates the first time-frequency resource.

In one embodiment, the first signaling is a Grant DCI of the first radio signal.

In one embodiment, the first coefficient is not less than 0 and not greater than 1.

In one embodiment, the first coefficient is not less than 1.

In one embodiment, the first coefficient is related to a transmission beamforming vector corresponding to the first radio signal at the UE U2 side.

In one embodiment, the first coefficient is related to a reception beamforming vector corresponding to the first target signal at the UE U2 side.

In one embodiment, the first signaling comprises scheduling information of the first radio signal, the scheduling information includes at least one of time domain resources occupied, frequency domain resources occupied, Modulation and Coding Status (MCS), a Hybrid Automatic Repetition ReQuest (HARD) Process Number, a Redundancy Version (RV), or a New Data Indicator (NDI).

In one embodiment, the first signaling is an Uplink Grant DCI, the first radio signal is transmitted on a PUSCH.

In one embodiment, the first signaling is a DCI with LTE DCI format 0.

In one embodiment, the first signaling is a DCI with LTE DCI format 4.

In one embodiment, the first signaling is a DCI with NR DCI format 0_0.

In one embodiment, the first signaling is a DCI with NR DCI format 0_1.

In one embodiment, the first maximum transmitting power is linearly correlated to the first offset.

In one embodiment, a linear correlation coefficient between the first maximum transmitting power and the first offset is 1.

In one embodiment, the first maximum transmitting power is equal to a sum of RSRP of the first target signal and the first offset.

In one embodiment, the second signaling is an RRC signaling.

In one embodiment, the second signaling is broadcast.

In one embodiment, the first signaling comprises fourth information; the first target signal occupies a first RE set, the fourth information is used for indicating the first RE set.

In one embodiment, the first signaling comprises fourth information, the second signaling is a higher-layer signaling; the first target signal occupies a first RE set, the fourth information is used for indicating the first RE set.

Embodiment 6

Figure 6:
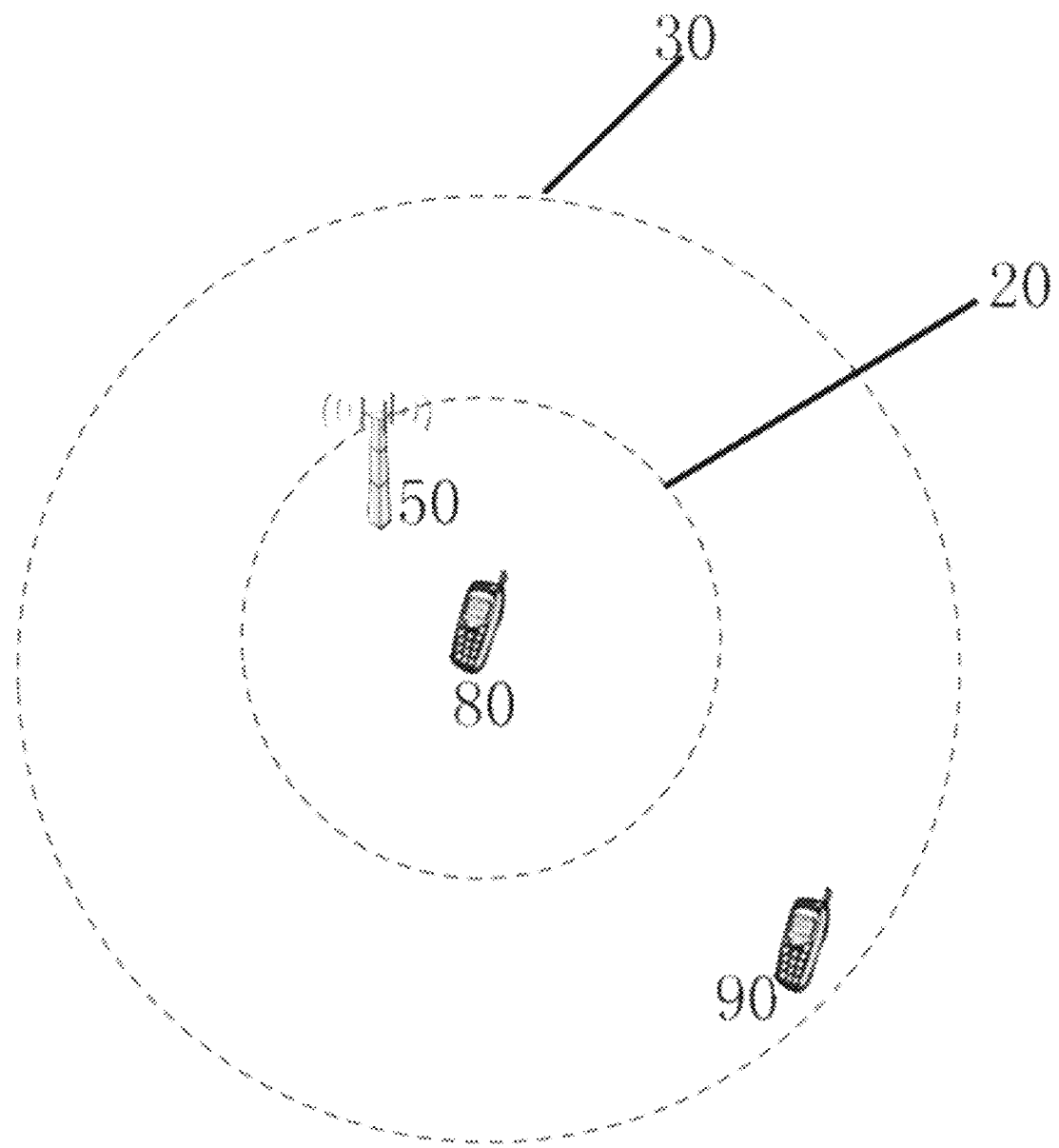
FIG. 6 illustrates a schematic diagram of power control according to one embodiment of the present disclosure.

Embodiment 6 illustrates a schematic diagram of power control, as shown in FIG. 6.

In Embodiment 6, a base station 50 is a maintenance base station for a first cell, the first cell is a serving cell of a UE U80; the first cell transmits a first target signal; if the UE 80 performs uplink transmission based on no-LBT, a corresponding maximum transmitting power is the first maximum transmitting power; if the UE 80 performs uplink transmission based on LBT, a corresponding maximum transmitting power is the second maximum transmitting power.

A broken circle 20 is a space area that a UE 80 can occupy when transmitting radio signals with a first maximum transmitting power, namely, when receivers within the broken circle 20 perform LBT, radio signals transmitted by a UE 80 with a first maximum transmitting power will cause receivers within the broken circle 20 to assume that a channel is occupied rather than cause receivers outside the broken circle 20 to assume that a channel is occupied; a broken circle 30 is a space area that a UE 80 can occupy when transmitting radio signals with a second maximum transmitting power, namely, when receivers within the broken circle 30 perform LBT, radio signals transmitted by a UE 80 with a second maximum transmitting power will cause receivers within the broken circle 30 to assume that a channel is occupied rather than cause receivers outside the broken circle 30 to assume that a channel is occupied.

A receiving power of the first target signal in the UE 80 is a first reference power, a space area reserved for the UE 80 by transmission of the first cell is related to the first reference power; in the space area reserved for the UE 80 by transmission of the first cell, the UE 80 can perform uplink transmission based on no-LBT; therefore, the first maximum transmitting power is related to the first reference power.

In one embodiment, the broken circle 20 belongs to the space area reserved for the UE 80 by transmission of the first cell, and an interval between a deadline for the transmission of the first cell and a start time for transmission of the UE 80 is no longer than 15 µs.

In the above embodiment, transmission of the UE 80 does not block transmission of transmitters outside the space area reserved for the UE 80 by transmission of the first cell, thus ensuring equity among multiple Radio Access Technologies.

In one embodiment, the second maximum transmitting power is $P_{CMAX,f,c}(i)$ wherein f, c and i are carriers occupied by a first radio signal, a serving cell corresponding to a first radio signal and a PUSCH transmission interval occupied by a first radio signal, respectively. A specific description of $P_{CMAX,f,c}(i)$ can be found in 3GPP TS38.213, Section 7.

Embodiment 7

Figure 7:
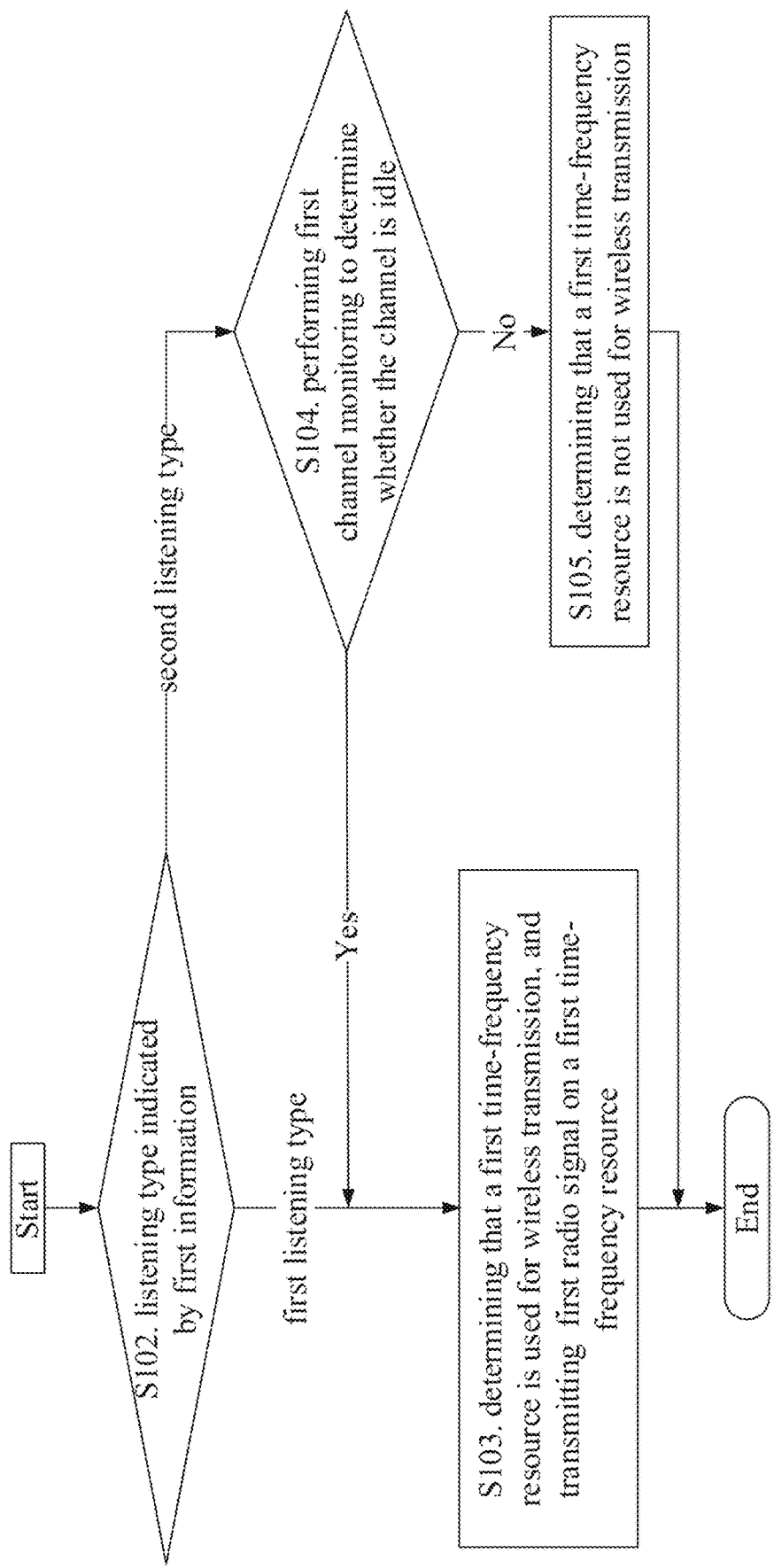
FIG. 7 illustrates a flowchart of determining whether a first time-frequency resource is used for wireless transmission based on a listening type indicated by first information according to one embodiment of the present disclosure.

Embodiment 7 illustrates a flowchart of determining whether a first time-frequency resource is used for wireless transmission based on a listening type indicated by first information, as shown in FIG. 7. Steps in FIG. 7 are implemented in a UE.

In step S102, a UE determines a listening type indicated by first information; if the listening type indicated by the first information is a first listening type, the UE determines that the first time-frequency resource is used for wireless transmission, and transmits a first radio signal on the first time-frequency resource in step S103; if the listening type indicated by the first information is a second listening type, the UE performs a first channel detection to determine whether the channel is idle; if the result is yes, move on to step S103, if the result is no, step 104 comes to an end.

In Embodiment 7, a transmitting power of the first radio signal is a first power, if the listening type indicated by the first information is a first listening type, the first power cannot exceed a first maximum transmitting power; if the listening type indicated by the first information is a second listening type, the first power cannot exceed a second maximum transmitting power, the second maximum transmitting power is greater than the first maximum transmitting power.

In one embodiment, the phrase that it is determined that the first time-frequency resource is used for wireless transmission comprises: generating the first radio signal.

Embodiment 8

Figure 8:
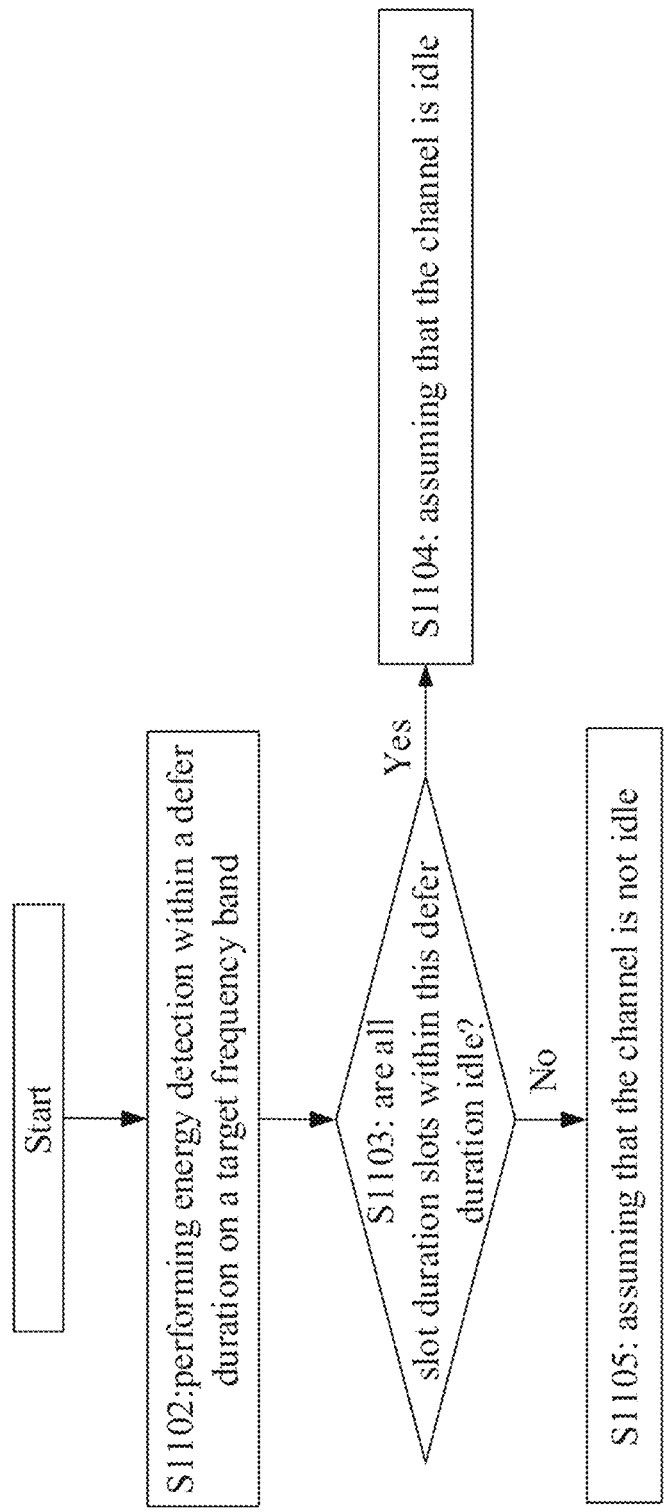
FIG. 8 illustrates a flowchart of a first channel monitoring for one shot according to one embodiment of the present disclosure.

Embodiment 8 illustrates a flowchart of a first channel monitoring for one shot, as shown in FIG. 8.

A receiver performs energy detection in a defer duration of a target frequency band in step S1102; determines whether all slot durations within the defer duration are idle in step S1103, if the result is yes, move on to step 1104 to assume that a channel is idle; if the result is no, move on to step S1105 to assume that the channel is not idle.

In one embodiment, duration time of the defer duration is 25 μs.

In one embodiment, duration time of the defer duration is no longer than 25 μs.

In one embodiment, duration time of the defer duration is not less than 16 μs.

In one embodiment, duration time of the defer duration is fixed.

In one embodiment, each of the slot durations in the defer duration is 9 μs.

In one embodiment, each of the slot durations in the defer duration is not less than 4 μs.

In one embodiment, all of the slot durations in the defer duration have equal duration time.

In one embodiment, the defer duration is sequentially divided into a positive integer number of the slot durations and a time slice, duration time of the time slice is less than that of the slot duration.

In one embodiment, a first radio signal is transmitted on the target frequency band.

In one embodiment, the target frequency band is a Bandwidth Part (BWP).

In one embodiment, the target frequency band is a carrier.

In one embodiment, in step S1103, for any slot duration in the defer duration, if a received power is greater than a specific threshold, a channel in the any slot duration is assumed to be non-idle, if a received power is not greater than a specific threshold, a channel in the any slot duration is assumed to be idle.

In one embodiment, in step S1103, for any slot duration in the defer duration, if a received power is not less than a specific threshold, a channel in the any slot duration is assumed to be non-idle, if a received power is not greater than a specific threshold, a channel in the any slot duration is assumed to be idle.

In one embodiment, the specific threshold is −72 dBm.

In one embodiment, the specific threshold is configurable (i.e., relating to a downlink signaling)

In one embodiment, the specific threshold is related to a second maximum transmitting power.

Embodiment 9

Figure 9:
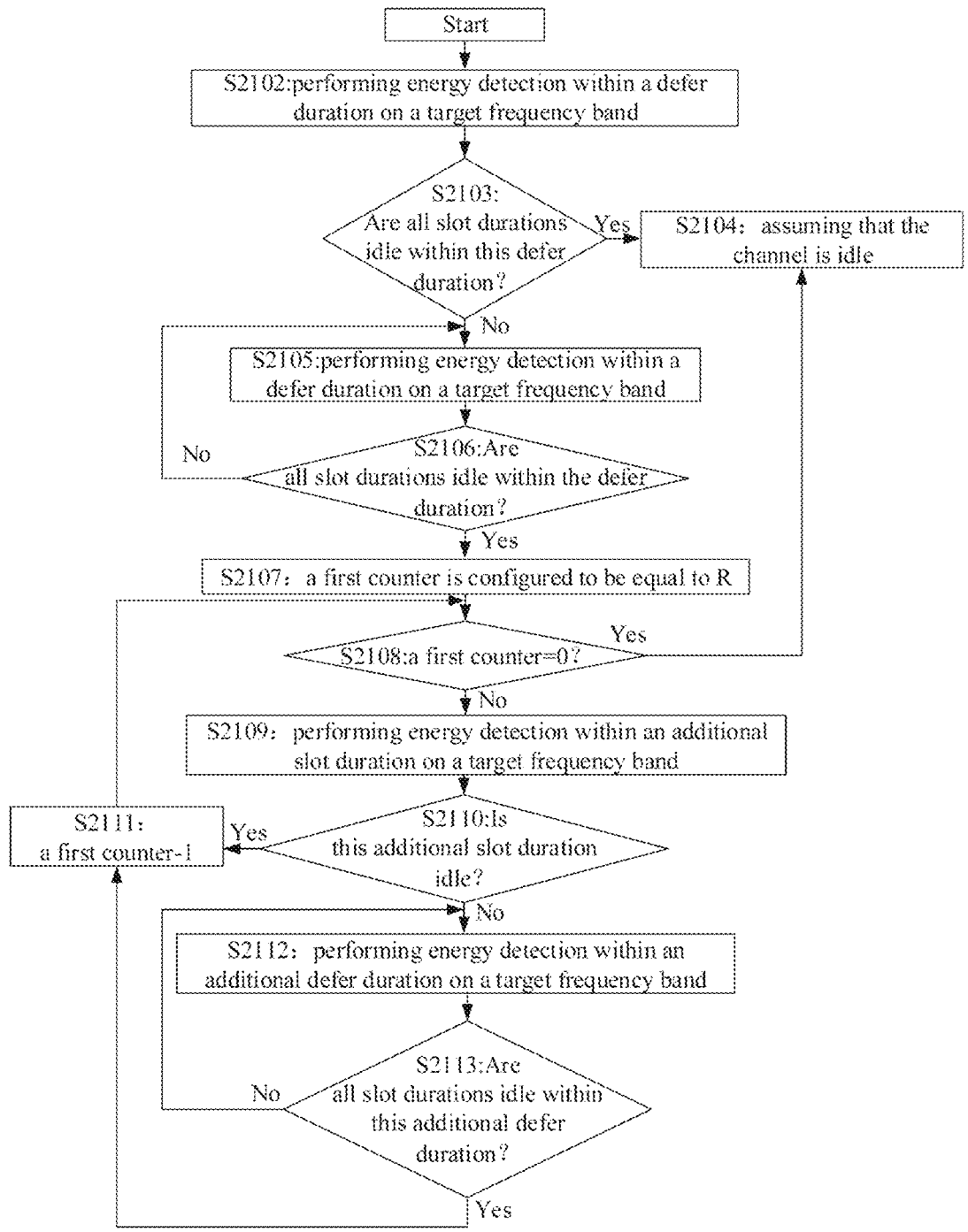
FIG. 9 illustrates a flowchart of a first channel monitoring for multiple shot according to one embodiment of the present disclosure.

Embodiment 9 illustrates a flowchart of a first channel monitoring for multiple shot, as shown in FIG. 9.

A receiver performs energy detection in a defer duration of a target frequency band in step S2102, determines whether all slot durations in the defer duration are idle in step S2103, if the result is yes, move on to step S2104 to assume that a channel is idle; if the result is no, then move on to step S2105 to perform energy in a defer duration of a target frequency band; determines whether all slot durations in the defer duration are idle in step S2106, if the result is yes, move on to step S2107 to configure a first counter to be equal to R1; otherwise, move back to step S2105; determines whether the first counter is 0 in step S2108, if the result is yes, move back to step S2104; if the result is no, move on to step S2109 to perform energy detection in an additional slot duration of a target frequency band; determines whether the additional slot duration is idle in step S2110, if the result is yes, move on to step S2111 to reduce the first counter by 1, and then moves back to step S2108; if the result is no, move on to step S2112 to perform energy detection in an additional defer duration of a target frequency band; and determines whether all slot durations in the additional defer duration are idle in step S2113, if the result is yes, move back to step S2111, if the result is no, move back to step S2112.

In Embodiment 9, if the step S2104 is not performed before start time of a first time-frequency resource, it is assumed that a channel is not idle.

Embodiment 10

Figure 10:
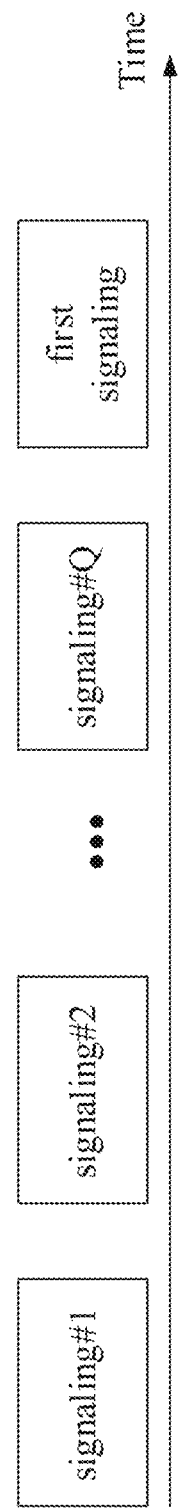
FIG. 10 illustrates a schematic diagram of Q signaling(s) according to one embodiment of the present disclosure.

Embodiment 10 illustrates a schematic diagram of Q signaling(s), as shown in FIG. 10.

In Embodiment 10, a UE receives Q signaling(s) sequentially in time, namely, signaling #1, signaling #2 . . . , and signaling #Q in FIG. 10; the UE receives a first signaling after receiving the Q signaling(s), the first signaling comprises first information and scheduling information of a first radio signal, a transmitting power of the first radio signal is a first power; any signaling of the Q signaling(s) indicates a listening type and a power offset; for any signaling of the Q signaling(s), if the listening type indicated by the any signaling and the listening type indicated by first information are the same, the first power is related to the power offset indicated, otherwise, the first power is not related to the power offset indicated.

In one embodiment, each of the Q signaling(s) is used for scheduling an uplink Grant DCI on a target frequency band.

In one embodiment, the first signaling indicates a power offset, the first power is related to a power offset indicated by the first signaling.

In one embodiment, the Q signaling(s) comprises (comprise) Q TPC command(s) respectively, the Q TPC command(s) indicates (indicate) Q power offset(s) respectively.

In one embodiment, between the signaling #1 and the first signaling, the UE does not receive a command of resetting TPC command accumulation.

Embodiment 11

Figure 11:
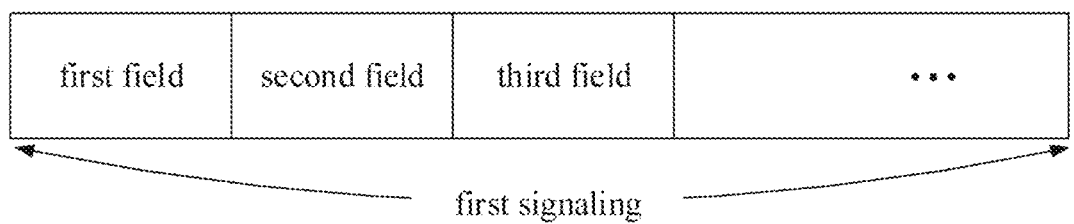
FIG. 11 illustrates a schematic diagram of a first signaling according to one embodiment of the present disclosure.

Embodiment 11 illustrates a schematic diagram of a first signaling, as shown in FIG. 11.

In Embodiment 11, a first signaling comprises a first field, a second field and a third field; the first field of the first signaling indicates first information, the second field of the first signaling indicates scheduling information of a first radio signal; a transmitting power of the first radio signal is a first power.

In Embodiment 11, if the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the third field of the first signaling is a TPC command.

In one embodiment, the third field of the first signaling indicates a first RE set out of L RE sets, the first target signal occupies a first RE set, the L RE sets are configured by a higher-layer signaling, the L is a positive integer greater than 1.

In one embodiment, the fourth information in the present disclosure comprises the third field of the first signaling and the higher-layer signaling.

Embodiment 12

Figure 12:
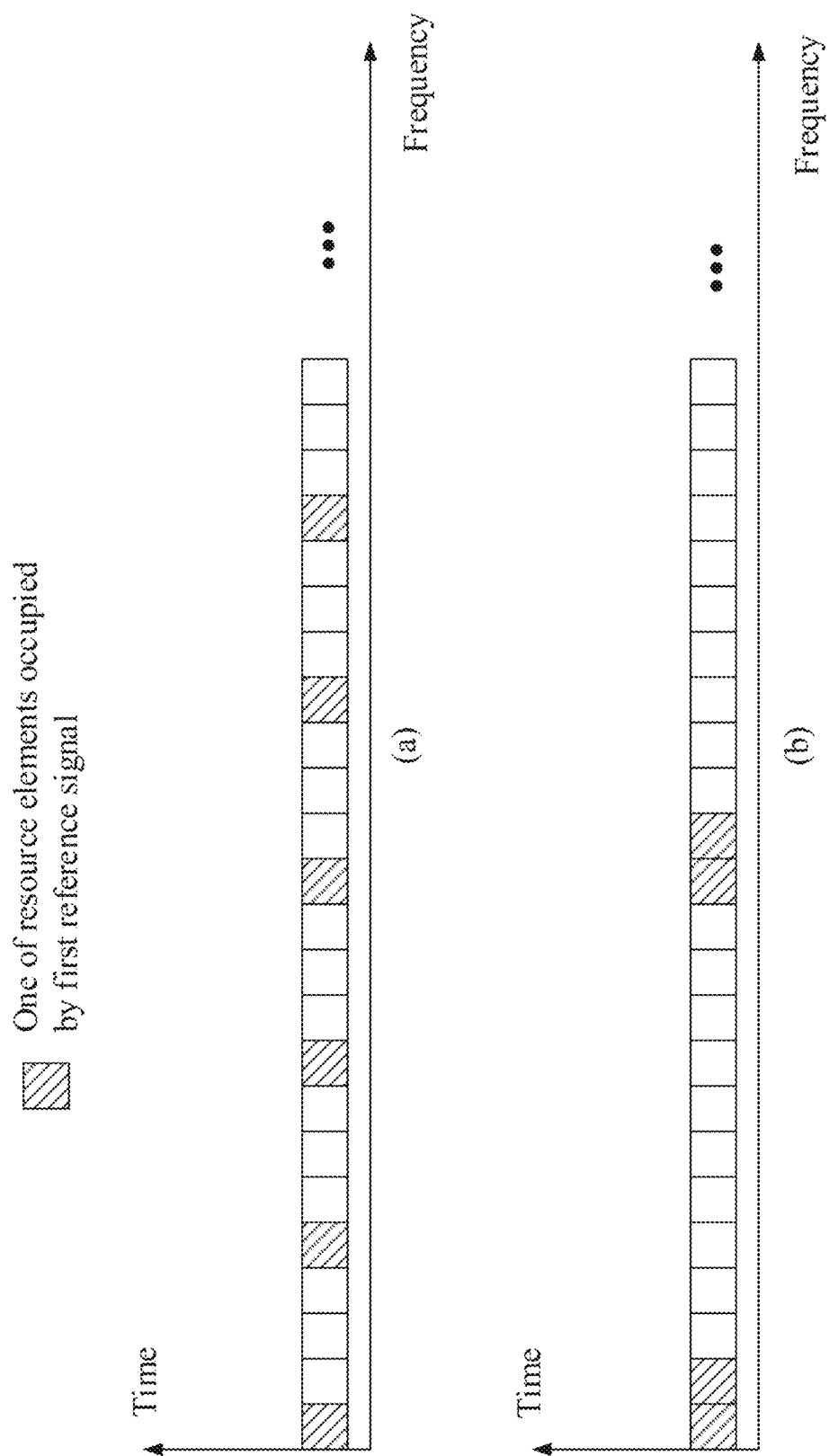
FIG. 12 illustrates a schematic diagram of resource elements occupied by a first target signal within a multicarrier symbol according to one embodiment of the present disclosure.

Embodiment 12 illustrates a schematic diagram of resource elements occupied by a first target signal within a multicarrier symbol, as shown in FIG. 12.

In FIG. 12(a), in a multicarrier symbol, a first target signal occupies a sub-carrier every other four (4) consecutive sub-carriers.

In FIG. 12(b), in a multicarrier symbol, a first target signal occupies two sub-carriers every other twelve (12) consecutive sub-carriers.

In one embodiment, the first target signal comprises a CSI-RS.

In one embodiment, a pattern (i.e., occupied resource elements) of the first target signal in a multicarrier symbol is one of P patterns, the P is a positive integer greater than 1, two patterns of the P patterns are FIG. 12(a) and FIG. 12(b) respectively.

In one subembodiment of the above embodiment, a first signaling indicates the pattern of the first target signal in a multicarrier symbol out of the P patterns.

Embodiment 13

Figure 13:
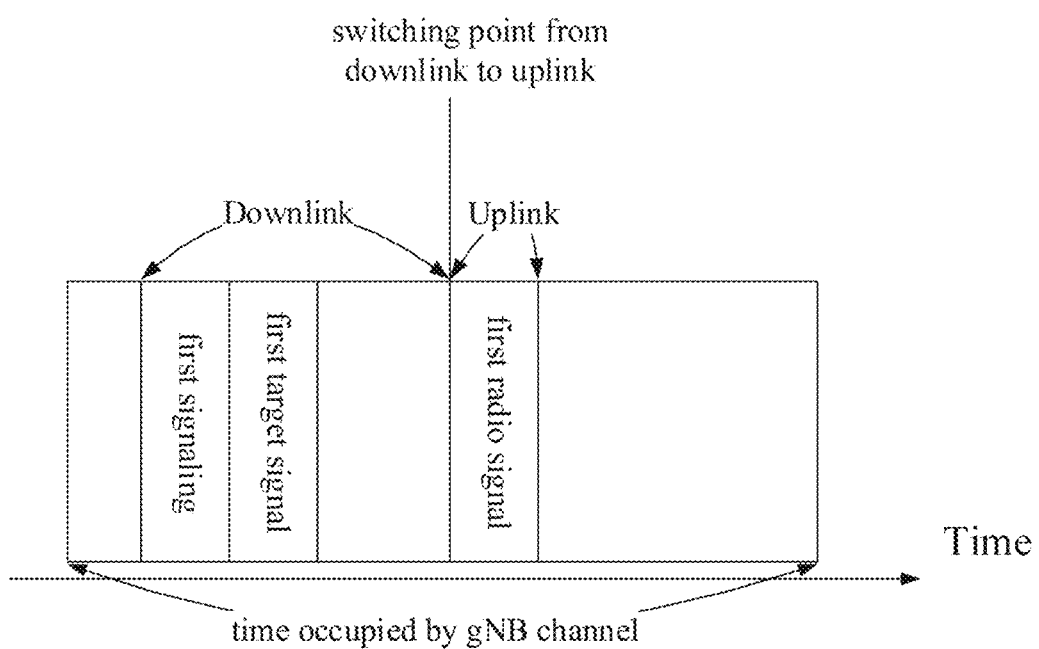
FIG. 13 illustrates a schematic diagram of gNB Channel Occupy Time (COT) according to one embodiment of the present disclosure.

Embodiment 13 illustrates a schematic diagram of gNB Channel Occupy Time (COT), as shown in FIG. 13.

In Embodiment 13, time domain resources occupied by a first signaling, time domain resources occupied by a first target signal and time domain resources occupied by a first radio signal belong to a same gNB COT; the time domain resources occupied by a first signaling and the time domain resources occupied by a first target signal are allocated to downlink transmission, time domain resources occupied by the first radio signal are allocated to uplink transmission; start time for the first radio signal is a switching point from downlink to uplink.

In Embodiment 13, when transmitting a first signaling a serving cell can ensure that downlink transmission is maintained (that is, reserving a wireless channel for a UE) till the switching point from downlink to uplink. On the contrary, if time domain resources occupied by a first signaling and time domain resources occupied a first radio signal don't belong to a same gNB COT, a serving cell cannot ensure that downlink transmission is maintained till the switching point from downlink to uplink when transmitting a first signaling (the serving cell needs to perform new LBT, so downlink transmission may not be passed).

Embodiment 14

Figure 14:
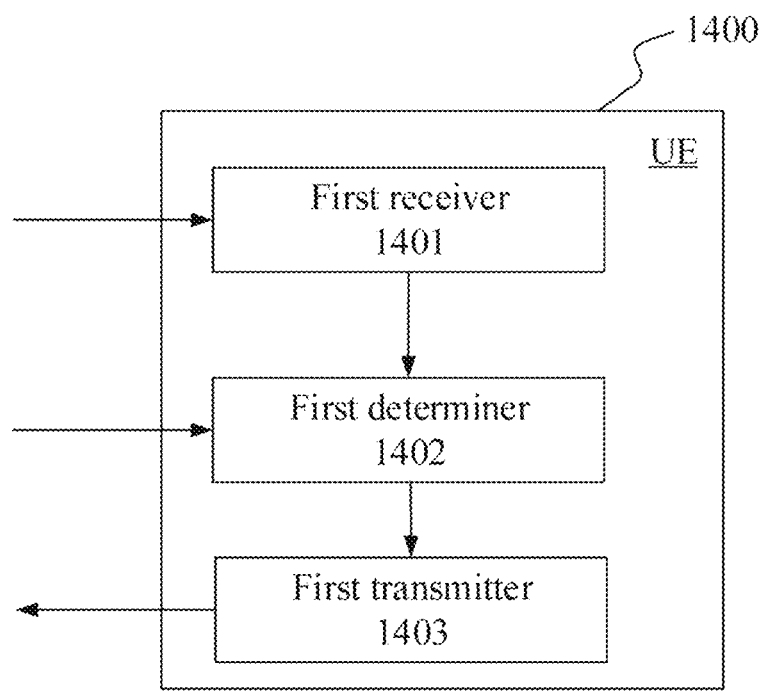
FIG. 14 illustrates a structure block diagram of a processing device in a UE according to one embodiment of the present disclosure.

Embodiment 14 illustrates a structure block diagram of a processing device in a UE, as shown in FIG. 14. In Embodiment 14, a UE 1400 comprises a first receiver 1401, a first determiner 1402 and a first transmitter 1403.

In Embodiment 14, a first receiver 1401 receives a first signaling and a first target signal, the first signaling comprises first information, the first information indicates a listening type; a first determiner 1402 determines whether a first time-frequency resource is used for wireless transmission based on the listening type indicated by the first information; if it is determined that a first time-frequency resource is used for wireless transmission, a first transmitter 1403 transmits a first radio signal with a first power on the first time-frequency resource; otherwise, a first transmitter 1403 drops wireless transmission on the first time-frequency resource.

In Embodiment 14, the first signaling is a DCI, if the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the first receiver 1401 receives second information; wherein the second information indicates a first offset, the first offset is used for determining the first maximum transmitting power.

In one embodiment, the first receiver 1401 receives third information; wherein the third information indicates a first coefficient, the first maximum transmitting power is linearly correlated to the reception quality of the first target signal, the first coefficient is a linear correlation coefficient between the first maximum transmitting power and the reception quality of the first target signal.

In one embodiment, the first receiver 1401 comprises the antenna 452, the receiver 454, and the receiving processor 456 in FIG. 4.

In one embodiment, the first receiver 1401 comprises at least one of the multi-antenna receiving processor 458, or the controller/processor 459 in FIG. 4.

In one embodiment, the first determiner 1402 comprises the antenna 452, the receiver 454 and the receiving processor 456 in FIG. 4.

In one embodiment, the first determiner 1402 comprises the multi-antenna receiving processor 458 in FIG. 4.

In one embodiment, the first transmitter 1403 comprises the antenna 452, the transmitter 454 and the transmitting processor 468 in FIG. 4.

In one embodiment, the first transmitter 1403 comprises at least one of the multi-antenna transmitting processor 457 and the controller/processor 459 in FIG. 4.

Embodiment 15

Figure 15:
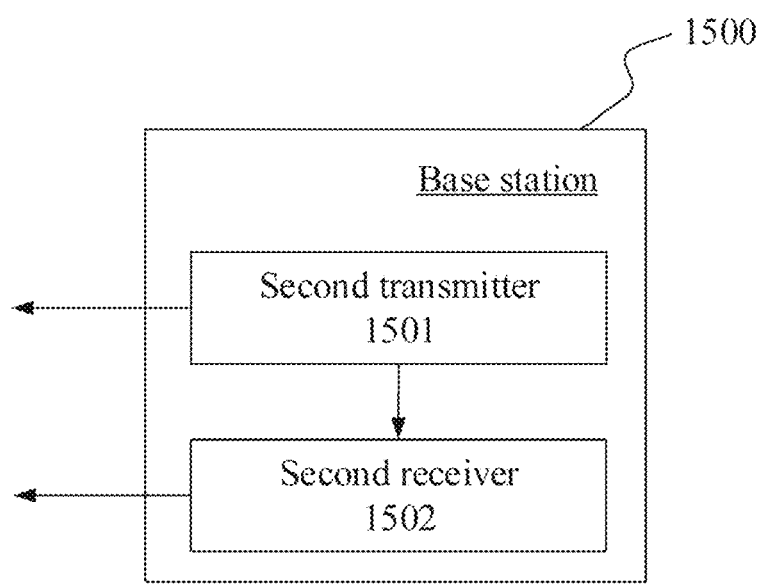
FIG. 15 illustrates a structure block diagram of a processing device in a base station according to one embodiment of the present disclosure.

Embodiment 15 illustrates a structure block diagram of a processing device in a base station, as shown in FIG. 15. In Embodiment 15, a base station 1500 comprises a second transmitter 1501 and a second receiver 1502.

In Embodiment 15, a second transmitter 1501 transmits first information and a first target signal, the first information indicates a listening type; a second receiver 1502 monitors a first radio signal on a first time-frequency resource.

In Embodiment 15, the listening type indicated by the first information is used for determining whether a first time-frequency resource is used for wireless transmission; if it is determined that a first time-frequency resource is used for wireless transmission, the first radio signal is transmitted with a first power on the first time-frequency resource; otherwise, wireless transmission on the first time-frequency resource is dropped. If the listening type indicated by the first information is a first listening type, the first power cannot exceed a first maximum transmitting power, reception quality of the first target signal is used for determining the first maximum transmitting power; if the listening type indicated by the first information is a second listening type, the first power cannot exceed a second maximum transmitting power, the second maximum transmitting power is greater than the first maximum transmitting power.

In one embodiment, the first information comprises 1 bit, the 1 bit indicates one of no-LBT and one shot LBT.

In one embodiment, the first information comprises multiple bits, the multiple bits indicate one of no-LBT, one shot LBT and multiple shot LBT; if the multiple bits indicate no-BLT, the listening type indicated by the first information is a first listening type, otherwise, the listening type indicated by the first information is a second listening type.

In one embodiment, the first information comprises multiple bits, the multiple bits indicate one of no-LBT, one shot LBT, first type multiple shot LBT and second type multiple shot LBT; if the multiple bits indicate no-LBT, the listening type indicated by the first information is a first listening type, otherwise, the listening type indicated by the first information is a second listening type.

In one embodiment, a second transmitter 1501 comprises the antenna 420, the transmitter 418 and the transmitting processor 416 in FIG. 4.

In one embodiment, a second transmitter 1501 comprises the multi-antenna transmitting processor 471 and the controller/processor 475 in FIG. 4.

In one embodiment, a second receiver 1502 comprises the antenna 420, the receiver 418 and the receiving processor 470 in FIG. 4.

In one embodiment, a second receiver 1502 comprises the multi-antenna receiving processor 472 and the controller/processor 475 in FIG. 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving first information and a first target signal, the first information indicates a listening type;
   determining whether a first time-frequency resource is used for wireless transmission based on the listening type indicated by the first information;
   if it is determined that the first time-frequency resource is used for wireless transmission, a first radio signal is transmitted with a first power on the first time-frequency resource; otherwise, wireless transmission on the first time-frequency resource is dropped;
   wherein if the listening type indicated by the first information is a first listening type, the first power cannot exceed a first maximum transmitting power, and reception quality of the first target signal is used for determining the first maximum transmitting power;
   if the listening type indicated by the first information is a second listening type, the first power cannot exceed a second maximum transmitting power, the second maximum transmitting power is greater than the first maximum transmitting power; and
   receiving one or more signalings;
   wherein any signaling of the one or more signalings indicates a listening type and a power offset; for any signaling of the one or more signalings, if the listening type indicated by the any signaling is the same as the listening type indicated by the first information, the first power is related to the power offset indicated, otherwise, the first power is not related to the power offset indicated.

2. The method according to claim 1, comprising:
   receiving second information;
   wherein the second information indicates a first offset, the first offset is used for determining the first maximum transmitting power; or, comprising:
   receiving third information;
   wherein the third information indicates a first coefficient, the first maximum transmitting power is linearly correlated to the reception quality of the first target signal, the first coefficient is a linear correlation coefficient between the first maximum transmitting power and the reception quality of the first target signal;
   or, comprising:
   receiving fourth information;
   wherein the first target signal occupies a first resource element set, the fourth information is used for indicating the first resource element set.

3. The method according to claim 1, wherein if the listening type indicated by the first information is the first listening type, it is determined that the first time-frequency resource is used for wireless transmission; or, if the listening type indicated by the first information is the second listening type, comprising:
   performing a first channel monitoring to determine whether the first time-frequency resource is used for wireless transmission.

4. The method according to claim 1, wherein the first information belongs to first DCI (downlink control information), the first DCI indicates the first time-frequency resource.

5. A method in a base station for wireless communication, comprising:
   transmitting first information and a first target signal, the first information indicates a listening type;
   monitoring a first radio signal on a first time-frequency resource;
   wherein the listening type indicated by the first information is used for determining whether a first time-frequency resource is used for wireless transmission;

if it is determined that the first time-frequency resource is used for wireless transmission, the first radio signal is transmitted with a first power on the first time-frequency resource;

otherwise, wireless transmission on the first time-frequency resource is dropped, if the listening type indicated by the first information is a first listening type, the first power cannot exceed a first maximum transmitting power, and reception quality of the first target signal is used for determining the first maximum transmitting power;

if the listening type indicated by the first information is a second listening type, the first power cannot exceed a second maximum transmitting power, the second maximum transmitting power is greater than the first maximum transmitting power;

transmitting one or more signalings; and wherein any signaling of the one or more signalings indicates a listening type and a power offset; for any signaling of the one or more signalings, if the listening type indicated by the any signaling is the same as the listening type indicated by the first information, the first power is related to the power offset indicated, otherwise, the first power is not related to the power offset indicated.

6. The method according to claim 5, comprising:
transmitting second information;
wherein the second information indicates a first offset, the first offset is used for determining the first maximum transmitting power; or, comprising:
transmitting third information;
wherein the third information indicates a first coefficient, the first maximum transmitting power is linearly correlated to the reception quality of the first target signal, the first coefficient is a linear correlation coefficient between the first maximum transmitting power and the reception quality of the first target signal;
or, comprising:
transmitting fourth information;
wherein the first target signal occupies a first resource element set, the fourth information is used for indicating the first resource element set.

7. The method according to claim 5, wherein if the listening type indicated by the first information is the first listening type, it is determined that a first time-frequency resource is used for wireless transmission; or, if the listening type indicated by the first information is the second listening type, a first channel monitoring is performed by a transmitter of the first radio signal so as to determine whether the first time-frequency resource is used for wireless transmission.

8. The method according to claim 5, wherein the first information belongs to first DCI, the first DCI indicates the first time-frequency resource.

9. A UE used for wireless communication, comprising:
a first receiver: receiving first information and a first target signal, the first information indicates a listening type;
a first determiner: determining whether a first time-frequency resource is used for wireless transmission based on the listening type indicated by the first information; and
a first transmitter: if it is determined that the first time-frequency resource is used for wireless transmission, a first radio signal is transmitted with a first power on the first time-frequency resource; otherwise, wireless transmission on the first time-frequency resource is dropped;

wherein if the listening type indicated by the first information is a first listening type, the first power cannot exceed a first maximum transmitting power, and reception quality of the first target signal is used for determining the first maximum transmitting power;

if the listening type indicated by the first information is a second listening type, the first power cannot exceed a second maximum transmitting power, the second maximum transmitting power is greater than the first maximum transmitting power;

wherein the first receiver receives one or more signalings; and wherein any signaling of the one or more signalings indicates a listening type and a power offset; for any signaling of the one or more signalings, if the listening type indicated by the any signaling is the same as the listening type indicated by the first information, the first power is related to the power offset indicated, otherwise, the first power is not related to the power offset indicated.

10. The UE according to claim 9, wherein the first receiver receives second information; or, receives third information;
wherein the second information indicates a first offset, the first offset is used for determining the first maximum transmitting power; the third information indicates a first coefficient, the first maximum transmitting power is linearly correlated to the reception quality of the first target signal, the first coefficient is a linear correlation coefficient between the first maximum transmitting power and the reception quality of the first target signal.

11. The UE according to claim 9, wherein if the listening type indicated by the first information is the first listening type, the first determiner determines that the first time-frequency resource is used for wireless transmission; or, if the listening type indicated by the first information is the second listening type, the first determiner performs a first channel monitoring so as to determine whether the first time-frequency resource is used for wireless transmission.

12. The UE according to claim 9, wherein the first information belongs to first DCI, the first DCI indicates the first time-frequency resource.

13. The UE according to claim 9, wherein the first receiver receives fourth information;
wherein the first target signal occupies a first resource element set, the fourth information is used for indicating the first resource element set.

14. A base station used for wireless communication, comprising:
a second transmitter: transmitting first information and a first target signal, the first information indicates a listening type; and
a second receiver: monitoring a first radio signal on a first time-frequency resource;
wherein the listening type indicated by the first information is used for determining whether a first time-frequency resource is used for wireless transmission;
if it is determined that the first time-frequency resource is used for wireless transmission, the first radio signal is transmitted with a first power on the first time-frequency resource; otherwise, wireless transmission on the first time-frequency resource is dropped,
if the listening type indicated by the first information is a first listening type, the first power cannot exceed a first maximum transmitting power, and reception quality of the first target signal is used for determining the first maximum transmitting power;

if the listening type indicated by the first information is a second listening type, the first power cannot exceed a second maximum transmitting power, the second maximum transmitting power is greater than the first maximum transmitting power;

wherein the second transmitter transmits one or more signalings; or, transmits fourth information;

wherein any signaling of the one or more signalings indicates a listening type and a power offset; for any signaling of the one or more signalings, if the listening type indicated by the any signaling is the same as the listening type indicated by the first information, the first power is related to the power offset indicated, otherwise, the first power is not related to the power offset indicated; the first target signal occupies a first resource element set, the fourth information is used for indicating first resource element set.

15. The base station according to claim 14, wherein the second transmitter transmits second information; or, transmits third information; wherein the second information indicates a first offset, the first offset is used for determining the first maximum transmitting power; the third information indicates a first coefficient, the first maximum transmitting power is linearly correlated to the reception quality of the first target signal, the first coefficient is a linear correlation coefficient between the first maximum transmitting power and the reception quality of the first target signal.

16. The base station according to claim 14, wherein if the listening type indicated by the first information is the first listening type, a first time-frequency resource is used for wireless transmission; or, if the listening type indicated by the first information is the second listening type, a first channel monitoring is performed by a transmitter of the first radio signal so as to determine whether the first time-frequency resource is used for wireless transmission.

17. The base station according to claim 14, wherein the first information belongs to first DCI, the first DCI indicates the first time-frequency resource.

* * * * *